(12) United States Patent
Li

(10) Patent No.: US 9,605,824 B1
(45) Date of Patent: Mar. 28, 2017

(54) IMITATION CANDLE DEVICE WITH ENHANCED CONTROL FEATURES

(71) Applicant: Xiaofeng Li, Shenzhen (CN)

(72) Inventor: Xiaofeng Li, Shenzhen (CN)

( * ) Notice: Subject to any disclaimer, the term of this patent is extended or adjusted under 35 U.S.C. 154(b) by 0 days.

(21) Appl. No.: 15/145,739

(22) Filed: May 3, 2016

(51) Int. Cl.
*H05B 33/08* (2006.01)
*F21S 10/04* (2006.01)
*H05B 37/02* (2006.01)
*F21S 6/00* (2006.01)
*F21S 9/02* (2006.01)
*F21Y 101/02* (2006.01)

(52) U.S. Cl.
CPC .............. *F21S 10/04* (2013.01); *F21S 6/001* (2013.01); *F21S 9/02* (2013.01); *H05B 33/0845* (2013.01); *H05B 33/0857* (2013.01); *H05B 37/0227* (2013.01); *H05B 37/0236* (2013.01); *H05B 37/0272* (2013.01); *F21Y 2101/02* (2013.01)

(58) Field of Classification Search
CPC ............ H05B 33/0815; H05B 33/0818; H05B 33/0845; H05B 33/0809; H05B 33/0848; H05B 33/0896; H05B 37/0272; H05B 37/0227
USPC ......................................... 315/292, 294, 307
See application file for complete search history.

(56) References Cited

U.S. PATENT DOCUMENTS

| 782,156 | A | 2/1905 | Meeker |
|---|---|---|---|
| 817,772 | A | 4/1906 | Helmer |
| 1,507,371 | A | 8/1924 | Goodridge |
| 1,842,167 | A | 1/1932 | Hall |
| 1,955,042 | A | 4/1934 | Work |
| D102,561 | S | 12/1936 | Lamb |
| 2,435,811 | A | 2/1948 | Waters |
| 2,932,351 | A | 6/1958 | Bried |
| 2,976,450 | A | 3/1961 | Benoliel |
| 2,984,032 | A | 5/1961 | Cornell |
| 3,233,093 | A | 2/1966 | Gerlat |
| 3,384,774 | A | 5/1968 | English |
| 3,425,157 | A | 2/1969 | Hartsock |
| 3,514,660 | A | 5/1970 | Kopelman |
| 3,603,013 | A | 9/1971 | Gardiner |
| 3,639,749 | A | 2/1972 | Beckman |

(Continued)

FOREIGN PATENT DOCUMENTS

| CN | 1030823 | 2/1989 |
|---|---|---|
| CN | 2483103 | 3/2002 |

(Continued)

OTHER PUBLICATIONS

U.S. Appl. No. 61/101,611 to Schnuckle, filed Sep. 30, 2008.

(Continued)

*Primary Examiner* — Douglas W Owens
*Assistant Examiner* — Syed M Kaiser
(74) *Attorney, Agent, or Firm* — Perkins Coie LLP

(57) ABSTRACT

Imitation candle devices and systems with enhanced features are described that facilitate operation and usage of electronic candles. The disclosed features include blow sensors that are positioned inside of the imitation candle device, or within an associated remote control device, to enable the electronic candle to be turned on or off remotely, when a user blows into the candle or the remote control devices. Additionally, the imitation candle can be turned on or off by a simple user action, such as touching the imitation candle device.

13 Claims, 12 Drawing Sheets

(56) References Cited

U.S. PATENT DOCUMENTS

| | | |
|---|---|---|
| 3,681,588 A | 8/1972 | Lee |
| 3,814,973 A | 6/1974 | Thouret et al. |
| 3,890,085 A | 6/1975 | Andeweg |
| 4,026,544 A | 5/1977 | Plambeck et al. |
| 4,067,111 A | 1/1978 | Truitt |
| 4,328,534 A | 5/1982 | Abe |
| 4,477,249 A | 10/1984 | Ruzek et al. |
| 4,550,363 A | 10/1985 | Sandell |
| 4,551,794 A | 11/1985 | Sandell |
| 4,617,614 A | 10/1986 | Lederer |
| 4,728,871 A | 3/1988 | Andrews |
| 4,777,571 A | 10/1988 | Morgan |
| 4,866,580 A | 9/1989 | Blackerby |
| 4,965,707 A | 10/1990 | Butterfield |
| 5,072,208 A | 12/1991 | Christensen |
| 5,097,180 A | 3/1992 | Ignon et al. |
| 5,152,602 A | 10/1992 | Boschetto |
| 5,381,325 A | 1/1995 | Messana |
| 5,707,282 A | 1/1998 | Clements et al. |
| 5,924,784 A | 7/1999 | Chliwnyj et al. |
| 6,198,229 B1 | 3/2001 | McCloud |
| 6,241,362 B1 | 6/2001 | Morrison |
| 6,257,755 B1 | 7/2001 | Sevelle |
| 6,302,555 B1 | 10/2001 | Bristow |
| 6,312,137 B1 | 11/2001 | Hsieh |
| 6,454,425 B1 | 9/2002 | Lin |
| 6,461,011 B1 | 10/2002 | Harrison |
| 6,491,516 B1 * | 12/2002 | Tal .................. A47G 33/00 273/147 |
| 6,511,219 B2 | 1/2003 | Sevelle |
| D486,924 S | 2/2004 | Skradski et al. |
| 6,688,752 B2 | 2/2004 | Moore |
| 6,712,493 B2 | 3/2004 | Tell et al. |
| 6,757,487 B2 | 6/2004 | Martin et al. |
| 6,781,270 B2 | 8/2004 | Long |
| 6,953,401 B2 | 10/2005 | Starr |
| 6,955,440 B2 | 10/2005 | Niskanen |
| 6,966,665 B2 | 11/2005 | Limburg et al. |
| 7,029,146 B2 | 4/2006 | Kitchen |
| 7,080,472 B2 | 7/2006 | Schroeter et al. |
| 7,083,315 B2 | 8/2006 | Hansler et al. |
| 7,093,949 B2 | 8/2006 | Hart et al. |
| 7,111,421 B2 | 9/2006 | Corry et al. |
| 7,118,243 B2 | 10/2006 | McCavit et al. |
| 7,125,142 B2 | 10/2006 | Wainwright |
| 7,159,994 B2 | 1/2007 | Schnuckle et al. |
| D545,458 S | 6/2007 | Jensen |
| 7,261,455 B2 | 8/2007 | Schnuckle et al. |
| 7,300,179 B1 | 11/2007 | LaDuke et al. |
| 7,305,783 B2 | 12/2007 | Mix et al. |
| D567,993 S | 4/2008 | Shiu |
| 7,360,935 B2 | 4/2008 | Jensen et al. |
| D576,317 S | 9/2008 | Jensen |
| D589,176 S | 3/2009 | Huang et al. |
| D599,491 S | 9/2009 | Luo |
| 7,633,232 B2 | 12/2009 | Wong |
| 7,686,471 B2 | 3/2010 | Reichow |
| 7,824,627 B2 | 11/2010 | Michaels et al. |
| 7,828,462 B2 | 11/2010 | Jensen et al. |
| 7,837,355 B2 | 11/2010 | Schnuckle |
| 8,070,319 B2 | 12/2011 | Schnuckle et al. |
| 8,081,872 B2 | 12/2011 | Wang |
| 8,132,936 B2 | 3/2012 | Patton et al. |
| 8,210,708 B2 | 7/2012 | Hau et al. |
| 8,235,558 B1 | 8/2012 | Lauer |
| 8,256,935 B1 | 9/2012 | Cullimore et al. |
| 8,454,190 B2 | 6/2013 | Hau et al. |
| 8,534,869 B2 | 9/2013 | Patton et al. |
| 8,696,166 B2 | 4/2014 | Patton et al. |
| 8,789,986 B2 | 7/2014 | Li |
| 8,894,261 B2 | 11/2014 | Chen |
| 8,926,137 B2 | 1/2015 | Li |
| 8,998,461 B2 | 4/2015 | Gutstein et al. |
| 9,033,553 B2 | 5/2015 | Li |
| 9,052,078 B2 | 6/2015 | Sheng |
| 9,335,014 B2 | 5/2016 | Patton et al. |
| 9,360,181 B2 | 6/2016 | Li |
| 9,366,402 B2 | 6/2016 | Li |
| 9,371,972 B2 | 6/2016 | Li |
| 9,371,973 B2 | 6/2016 | Li |
| 9,447,938 B2 | 9/2016 | Li |
| 2001/0033488 A1 | 10/2001 | Chliwnyj et al. |
| 2002/0080601 A1 | 6/2002 | Meltzer |
| 2003/0041491 A1 | 3/2003 | Mix |
| 2003/0053305 A1 | 3/2003 | Lin |
| 2003/0072154 A1 | 4/2003 | Moore |
| 2004/0114351 A1 | 6/2004 | Stokes et al. |
| 2004/0165374 A1 | 8/2004 | Robinson |
| 2004/0223326 A1 | 11/2004 | Wainwright |
| 2005/0007779 A1 * | 1/2005 | Nozawa .................. F21S 10/04 362/253 |
| 2005/0097792 A1 | 5/2005 | Naden |
| 2005/0169812 A1 | 8/2005 | Helf |
| 2005/0196716 A1 | 9/2005 | Haab et al. |
| 2005/0254248 A1 | 11/2005 | Lederer |
| 2005/0285538 A1 | 12/2005 | Jaworski et al. |
| 2006/0034079 A1 | 2/2006 | Schnuckle et al. |
| 2006/0034100 A1 | 2/2006 | Schnuckle et al. |
| 2006/0101681 A1 | 5/2006 | Hess et al. |
| 2006/0120080 A1 | 6/2006 | Sipinski et al. |
| 2006/0146544 A1 | 7/2006 | Leung |
| 2006/0192503 A1 * | 8/2006 | Trombetta .............. F21S 6/001 315/308 |
| 2007/0002560 A1 | 1/2007 | Gutstein et al. |
| 2007/0053174 A1 | 3/2007 | Lin |
| 2007/0127249 A1 | 6/2007 | Medley et al. |
| 2007/0154857 A1 | 7/2007 | Cho |
| 2007/0159422 A1 | 7/2007 | Blandino et al. |
| 2007/0236947 A1 | 10/2007 | Jensen et al. |
| 2008/0074875 A1 | 3/2008 | Jensen et al. |
| 2008/0112154 A1 | 5/2008 | Reichow |
| 2008/0129226 A1 | 6/2008 | DeWitt et al. |
| 2008/0130266 A1 | 6/2008 | DeWitt et al. |
| 2008/0151563 A1 | 6/2008 | Chen |
| 2008/0151571 A1 | 6/2008 | Chen |
| 2009/0059596 A1 | 3/2009 | Lederer |
| 2009/0135586 A1 | 5/2009 | Yang |
| 2010/0001662 A1 | 1/2010 | Nelkin |
| 2010/0079999 A1 | 4/2010 | Schnuckle |
| 2010/0134022 A1 | 6/2010 | Gutstein et al. |
| 2010/0207538 A1 | 8/2010 | Chen |
| 2011/0000666 A1 * | 1/2011 | Couto .................. F22B 1/1853 166/272.3 |
| 2011/0019422 A1 | 1/2011 | Schnuckle |
| 2011/0110073 A1 | 5/2011 | Schnuckle et al. |
| 2011/0127914 A1 | 6/2011 | Patton |
| 2011/0195787 A1 * | 8/2011 | Wells .................. G07F 9/026 463/42 |
| 2011/0204828 A1 | 8/2011 | Moody et al. |
| 2011/0317403 A1 | 12/2011 | Fournier et al. |
| 2012/0049765 A1 | 3/2012 | Lu |
| 2012/0093491 A1 | 4/2012 | Browder |
| 2012/0134157 A1 | 5/2012 | Li |
| 2013/0050985 A1 | 2/2013 | Kwok et al. |
| 2013/0163249 A1 | 6/2013 | Miura |
| 2013/0223043 A1 | 8/2013 | Ray |
| 2013/0265748 A1 | 10/2013 | Hau et al. |
| 2014/0035483 A1 * | 2/2014 | Becker .................. F21S 9/02 315/294 |
| 2014/0140042 A1 | 5/2014 | Schreiber |
| 2014/0211499 A1 | 7/2014 | Fong et al. |
| 2014/0254148 A1 | 9/2014 | Fournier |
| 2014/0268652 A1 | 9/2014 | Li |
| 2014/0268704 A1 | 9/2014 | Yang |
| 2014/0274212 A1 | 9/2014 | Zurek et al. |
| 2014/0286024 A1 | 9/2014 | Li |
| 2014/0313694 A1 | 10/2014 | Patton |
| 2014/0362592 A1 | 12/2014 | Lee |
| 2015/0008845 A1 | 1/2015 | Kim et al. |
| 2015/0036348 A1 | 2/2015 | Dong |
| 2015/0070874 A1 | 3/2015 | Beesley |
| 2015/0109786 A1 | 4/2015 | Li |
| 2015/0124442 A1 | 5/2015 | Ding |
| 2015/0233538 A1 | 8/2015 | Sheng |

(56) References Cited

U.S. PATENT DOCUMENTS

| | | | |
|---|---|---|---|
| 2015/0308643 A1 | 10/2015 | Huang | |
| 2015/0369431 A1 | 12/2015 | Li | |
| 2015/0369432 A1 | 12/2015 | Li | |
| 2015/0373815 A1 | 12/2015 | Patton | |
| 2016/0029461 A1 | 1/2016 | Noh et al. | |
| 2016/0040844 A1 | 2/2016 | Patton | |
| 2016/0047517 A1 | 2/2016 | Li | |
| 2016/0057829 A1* | 2/2016 | Li | H05B 33/0827 315/313 |
| 2016/0109082 A1 | 4/2016 | Li | |
| 2016/0109083 A1 | 4/2016 | Li | |
| 2016/0186947 A1 | 6/2016 | Li | |
| 2016/0258584 A1 | 9/2016 | Li | |
| 2016/0290580 A1 | 10/2016 | Li | |

FOREIGN PATENT DOCUMENTS

| | | |
|---|---|---|
| CN | 2551859 | 5/2003 |
| CN | 2562059 Y | 7/2003 |
| CN | 1530142 A | 9/2004 |
| CN | 1646177 A | 7/2005 |
| CN | 2854329 Y | 1/2007 |
| CN | 2888274 Y | 4/2007 |
| CN | 200940808 Y | 8/2007 |
| CN | 201011621 Y | 1/2008 |
| CN | 201059432 Y | 5/2008 |
| CN | 201093300 | 7/2008 |
| CN | 201103952 Y | 8/2008 |
| CN | 201159425 Y | 12/2008 |
| CN | 101408284 A | 4/2009 |
| CN | 201235095 Y | 5/2009 |
| CN | 201418887 Y | 3/2010 |
| CN | 201533921 U | 7/2010 |
| CN | 101865413 A | 10/2010 |
| CN | 201643048 U | 11/2010 |
| CN | 102147095 A | 8/2011 |
| CN | 102748589 A | 10/2012 |
| CN | 203131550 | 8/2013 |
| CN | 203273670 U | 11/2013 |
| CN | 203442498 U | 2/2014 |
| CN | 203517611 U | 4/2014 |
| CN | 203571618 U | 4/2014 |
| CN | 104048246 | 9/2014 |
| CN | 104089241 | 10/2014 |
| CN | 203940346 | 11/2014 |
| CN | 204268356 | 4/2015 |
| DE | 1489617 A1 | 5/1969 |
| DE | 102012206988 A1 | 10/2013 |
| DE | 202013012047 U1 | 4/2015 |
| DE | 202015000490 U1 | 4/2015 |
| DE | 202015102274 U1 | 6/2015 |
| EP | 0138786 A1 | 4/1985 |
| EP | 0855189 A2 | 7/1998 |
| EP | 1838110 A1 | 9/2007 |
| EP | 2587127 A1 | 5/2013 |
| GB | 2230335 | 10/1990 |
| GB | 2267746 | 12/1993 |
| GB | 2323159 A | 9/1998 |
| GB | 2379731 A | 3/2003 |
| GB | 2385413 A | 8/2003 |
| GB | 2443926 | 5/2008 |
| GB | 2455598 A | 6/2009 |
| GB | 2527626 | 12/2015 |
| JP | H0652709 | 2/1994 |
| JP | H1057464 A | 3/1998 |
| JP | 2000284730 A | 10/2000 |
| JP | 2008180755 A | 8/2008 |
| WO | WO-8202756 A1 | 8/1982 |
| WO | WO-8503561 A1 | 8/1985 |
| WO | WO-8704506 A1 | 7/1987 |
| WO | WO-9625624 A1 | 8/1996 |
| WO | WO-0192780 | 12/2001 |
| WO | WO-03011349 | 2/2003 |
| WO | WO-2006020839 A2 | 2/2006 |
| WO | WO-2008092753 A2 | 8/2008 |
| WO | WO2010009575 | 1/2010 |
| WO | WO-2012000418 A1 | 1/2012 |
| WO | 2012099718 A1 | 7/2012 |
| WO | WO-2013020263 A2 | 2/2013 |
| WO | WO2013020439 | 2/2013 |

OTHER PUBLICATIONS

U.S. Appl. No. 61/293,516 to Patton, filed Jan. 8, 2010.
International Search Report and Written Opinion for PCT Application No. PCT/CN/2014/073557 mailed Jul. 2, 2014.
International Search Report for PCT Application No. PCT/US2009/054401 mailed Oct. 26, 2009.
EP Search Report for European Patent Application No. 12185984.7 mailed Dec. 14, 2012.
Engineer's Handbook (Epoxy definition), http://engineershandbook.com/Materials/epoxy.htm, Jul. 18, 2013.
Nagashima, H. et al., "Introduction to Chaos, Physics and Mathematics of Chaotic Phenomena," Institute of Physics Publishing, 1999.
Definition of "Electromagnet" in the Encarta World English Dictionary, Aug. 1999.
Lab M3: The Physical Pendulum, Physics 1140—Experimental Physics, Course Laboratory Instructions, 2000.
Notice of Allowance for U.S. Appl. No. 13/325,754 mailed Jun. 18, 2014, 10 pages.
Non-Final Office Action for U.S. Appl. No. 13/325,754 mailed Dec. 30, 2013, 14 pages.
Notice of Allowance for U.S. Appl. No. 14/161,143 mailed Nov. 13, 2014, 18 pages.
Final Office Action for U.S. Appl. No. 14/161,143 mailed Oct. 20, 2014, 15 pages.
Non-Final Office Action for U.S. Appl. No. 14/161,143 mailed Apr. 30, 2014, 18 pages.
Non-Final Office Action for U.S. Appl. No. 14/558,507 mailed Sep. 2, 2015, 21 pages.
Notice of Allowance for U.S. Appl. No. 14/588,507 mailed Dec. 4, 2015, 11 pages.
Non-Final Office Action for U.S. Appl. No. 14/558,507 mailed Mar. 17, 2016, 18 pages.
Notice of Allowance for U.S. Appl. No. 14/588,507 mailed May 3, 2016, 7 pages.
Non-Final Office Action for U.S. Appl. No. 14/925,893 mailed Feb. 25, 2016, 37 pages.
Final Office Action for U.S. Appl. No. 14/925,893 mailed Apr. 26, 2016, 29 pages.
Non-Final Office Action for U.S. Appl. No. 14/925,893 mailed May 16, 2016, 13 pages.
Non-Final Office Action for U.S. Appl. No. 14/925,899 mailed Jan. 5, 2016, 21 pages.
Non-Final Office Action for U.S. Appl. No. 14/925,899 mailed Apr. 14, 2016, 25 pages.
Non-Final Office Action for U.S. Appl. No. 14/927,213 mailed Feb. 25, 2016, 33 pages.
Notice of Allowance for U.S. Appl. No. 14/927,213 mailed May 11, 2016, 12 pages.
Non-Final Office Action for U.S. Appl. No. 14/925,899 mailed May 25, 2016, 18 pages.
Supplementary Search Report and Opinion for EP 14764844, Jul. 28, 2016, 12 pages.
Non-Final Office Action for U.S. Appl. No. 15/145,739 mailed Jul. 27, 2016, 22 pages.
Notice of Allowance for U.S. Appl. No. 14/925,893, mailed Jul. 20, 2016, 9 pages.
Notice of Allowance for U.S. Appl. No. 14/925,899, mailed Aug. 3, 2016, 9 pages.
Non-Final Office Action for U.S. Appl. No. 15/061,648 mailed Jul. 12, 2016, 47 pages.
Final Office Action for U.S. Appl. No. 14/928,696 mailed Jul. 14, 2016, 27 pages.
International Search Report for PCT/CN2014/091362 mailed Apr. 3, 2015, 2 pages.

(56) References Cited

OTHER PUBLICATIONS

Non-Final Office Action for U.S. Appl. No. 15/187,618 mailed Aug. 18, 2016, 13 pages.
Final Office Action for U.S. Appl. No. 13/908,571 mailed Sep. 30, 2014, 18 pages.
Final Office Action for U.S. Appl. No. 13/908,571 mailed Mar. 18, 2014, 21 pages.
Non-Final Office Action for U.S. Appl. No. 13/908,571 mailed Sep. 6, 2013, 12 pages.
Notice of Allowance for U.S. Appl. No. 13/526,067 mailed Feb. 6, 2013, 8 pages.
Non-Final Office Action for U.S. Appl. No. 13/526,067 mailed Jun. 18, 2012, 23 pages.
Final Office Action for U.S. Appl. No. 12/273,337 mailed Jan. 18, 2012, 17 pages.
Notice of Allowance for U.S. Appl. No. 12/273,337 mailed Mar. 26, 2012, 8 pages.
Non-Final Office Action for U.S. Appl. No. 12/273,337 mailed Nov. 18, 2008, 17 pages.
Notice of Allowance for U.S. Appl. No. 15/158,508 mailed Sep. 21, 2016, 8 pages.
Non-Final Office Action for U.S. Appl. No. 14/449,865 mailed Feb. 3, 2016, 9 pages.
Notice of Allowance for U.S. Appl. No. 15/061,648, mailed Sep. 23, 2016, 9 pages.
Non-Final Office Action for U.S. Appl. No. 15/137,951, mailed Oct. 24, 2016, 28 pages.
Notice of Allowance for U.S. Appl. No. 15/158,508, mailed Sep. 21, 2016, 8 pages.
UK Combined Search and Examination Report for GB1613387.8, mailed Sep. 9, 2016, 10 pages.
UK Combined Search and Examination Report for GB1613393.6, mailed Sep. 9, 2016, 10 pages.
Canadian Examination and Search Report for CA2936224, mailed Sep. 30, 2016, 5 pages.
UK Combined Search and Examination Report for GB1613391.0, mailed Sep. 19, 2016, 9 pages.
German Office Action issued for German Patent Application No. 10 2016 008 225.9, dated Dec. 19, 2016 (12 pages).
Canadian Examination Report issued for Canadian Patent Application No. 2,930,099, dated Jan. 5, 2017 (3 pages).

\* cited by examiner

IMITATION CANDLE DEVICE WITH ENHANCED CONTROL FEATURES

RELATED APPLICATIONS

This patent document claims priority to the Chinese patent application no. CN201610261921.2 filed on Apr. 25, 2016. The entire contents of the before mentioned patent application is incorporated by reference in this patent document.

FIELD OF INVENTION

The subject matter of this patent document relates to a candle devices that use an imitation flame, and particularly, to features that control the operation of imitation candle devices.

BACKGROUND

Traditional true flame candles, when lit, provide a pleasant ambience in many homes, hotels, churches, businesses, etc. Traditional candles, however, provide a variety of hazards including risk of fire, damage to surfaces caused by hot wax, and the possible emission of soot. Flameless candles have become increasingly popular alternatives to traditional candles. With no open flame or hot melted wax, flameless candles provide a longer-lasting, safe, and clean alternative. Such imitation candle devices often include light sources, such as LEDs, and include electronic circuits that control the operation the imitation candle device.

SUMMARY OF CERTAIN EMBODIMENTS

The disclosed embodiments relate to devices and methods for facilitating the operations and usage of electronic candle devices. The disclosed features enable an electronic candle device to be turned on or off remotely, by a simple user's actions including touching the imitation candle device, or blowing at the imitation candle or an associated remote control device.

One exemplary aspect of the disclosed embodiments relates to an imitation candle device that includes a body, a flame element protruding from top of the body, one or more light sources positioned to illuminate the flame element to produce an appearance of a true fire flame, a sensor positioned within the body to detect a blow of air directed at the imitation candle device, and electronic circuitry positioned within the body to receive electrical signals produced by the sensor and to modify an output light of the one or more light sources in response to detection of the blow.

Another exemplary aspect of the disclosed embodiments relates to an imitation candle system that includes an imitation candle device and a portable electronic device wirelessly coupled to the imitation candle device. The imitation candle device in such a system includes a body, a flame element protruding from top of the body, one or more light sources positioned to illuminate the flame element to produce an appearance of a true fire flame, and electronic circuitry positioned within the body to control at least the an output of the one or more light sources, the electronic circuitry including a wireless receiver to receive wireless signals. The portable electronic device of this system includes a display, a wireless transceiver, a processor, and a memory including processor executable code. The processor executable code, when executed by the processor, configures the portable electronic device to present a graphical user interface on the display. The graphical user display includes buttons or fields that allow activation of a blow off feature of the imitation candle device on the electronic device, and one or more of the following operations of the imitation candle device: a power-on or power-off operation, a selection of a particular imitation candle device, a selection of a timer feature, a setting of a timer value, a selection of a light intensity level, an adjustment of a light intensity level, a selection of a movement of the flame element, a setting of a level of movement of the flame element, or a selection of a group of imitation candle devices.

DETAILED DESCRIPTION OF CERTAIN EMBODIMENTS

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Imitation candle devices can simulate a real candle with a flame that resembles a real-life flame with flickering effects using optical, mechanical and electrical components. The disclosed embodiments provide further features and functionalities that enhance the operation of these devices, and in some cases, enable additional features that cannot be obtained with real candles.

Figure 1:
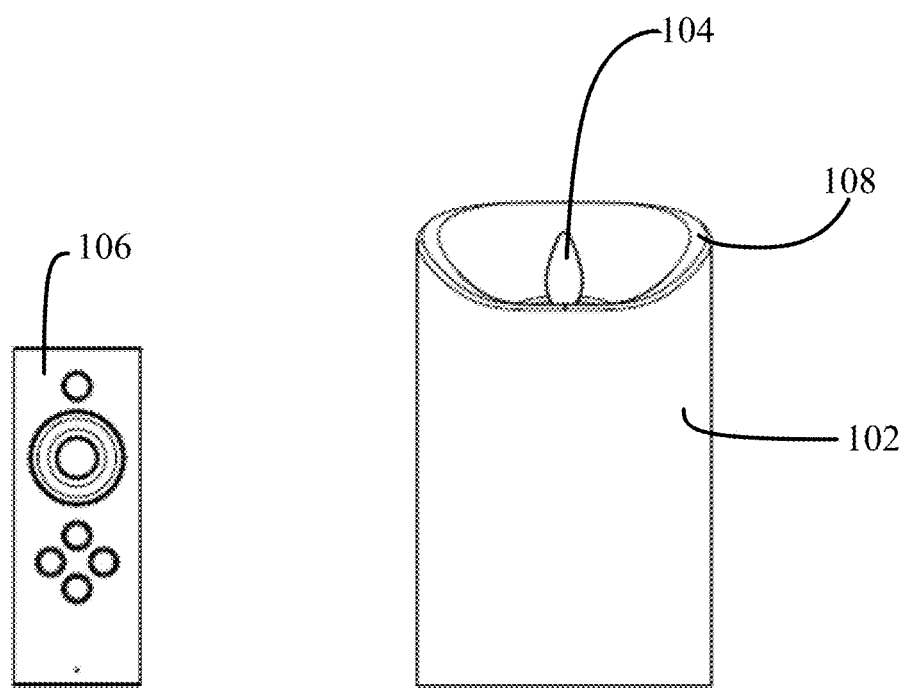
FIG. 1 illustrates an exemplary imitation candle device with an associated remote control device.

FIG. 1 illustrates an exemplary imitation candle device 102 with an associated remote control device 106 in accordance with an exemplary embodiment. The flame element 104 protrudes upward from the body of the imitation candle device 102, and the top portion 108 of the body is formed to resemble a melted candle wax to enhance the resemblance of the candle device 102 to a real candle. The remote control device 106 is configured to operate with the imitation candle device 102 via a wireless channel. For example, the remote control device 106 can include an infrared transmitter to provide various commands and signals to an infrared receiver of the imitation candle device 102. In some embodiments, other wireless communication protocols and techniques, such as Bluetooth, cellular, WiFi, etc., can be used. In certain applications, the communication channel that allows remote control of the imitation candle device can include a wired communication channel.

Figure 2A:
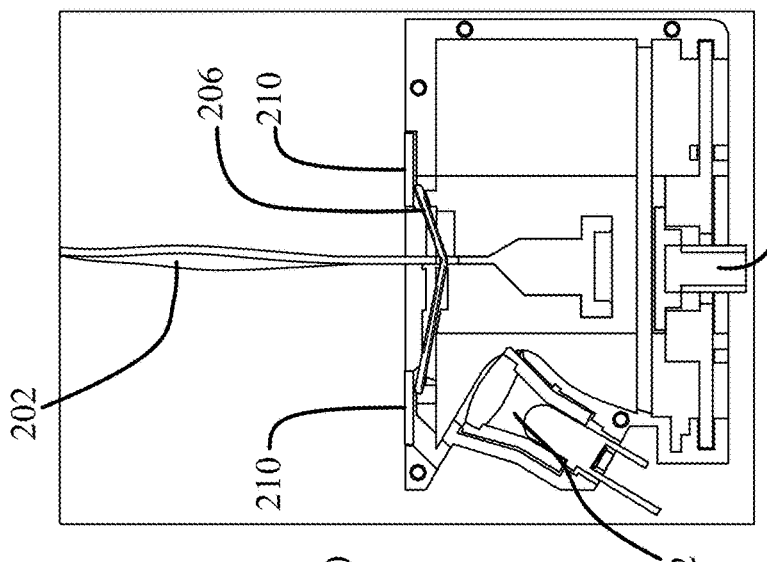
FIG. 2(A) illustrates certain components including a support mechanism for an artificial flame element of an exemplary imitation candle device.
Figure 2B:
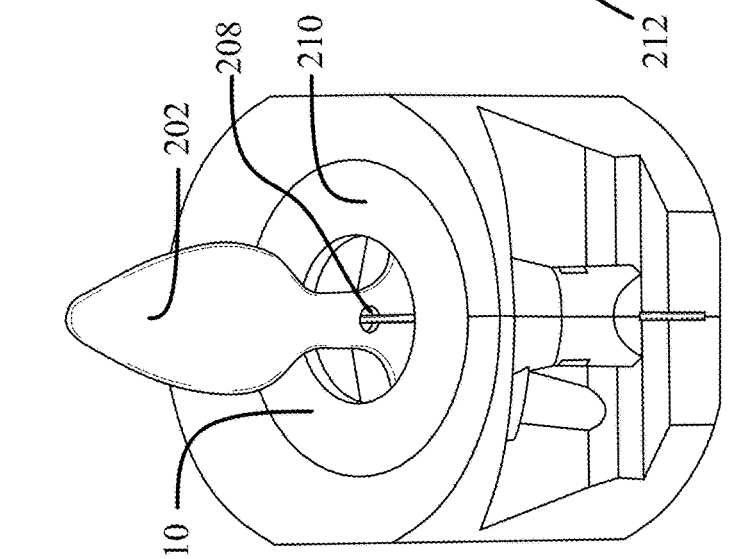
FIG. 2(B) illustrates certain components including a touch-sensitive structure of an exemplary imitation candle device.
Figure 2C:
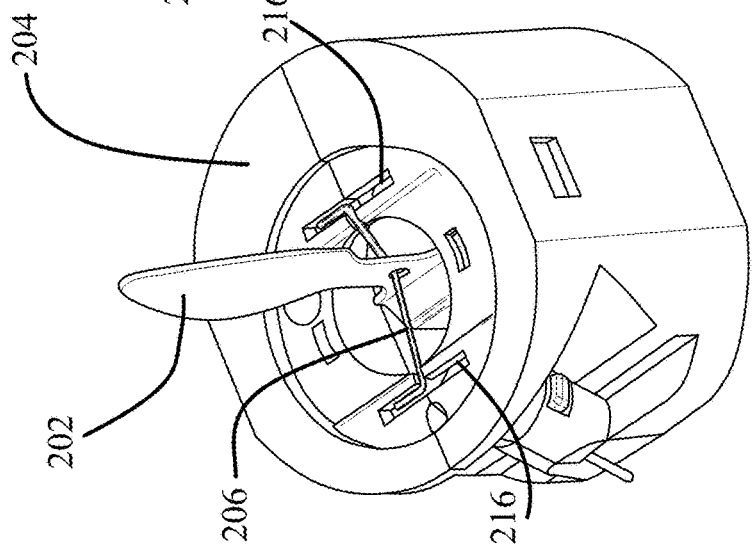
FIG. 2(C) illustrates is a side view of FIG. 2(B) including certain internal candle components.

FIGS. 2(A), 2(B) and 2(C) illustrate some of the components of an exemplary imitations candle device including an enclosure 214 that houses the internal candle components, and a flame element 202 that protrudes from top of the enclosure 214. The flame element 202 includes a hole 208 that allows a support structure 206 to pass through the hole to suspend the flame element 202. The ends of the support structure 206 are secured within slots 216 that are formed on top of the enclosure 214. As shown in the exemplary diagram of FIG. 2(A), the support structure 206 is bent at two ends to fit within the slots 216, and the is slightly bent downwards at the location of the hole 208. The top portion of the enclosure include an indentation to accommodate a plate 210 in the form of an annulus. It should be noted that in other implementations, the plate 210 can include other shapes, such as rectangular or triangular shapes, can be configured to not fully encircle the flame element 202 and/or made smaller or larger in size. As will be described in detail below, the annulus not only operates as a decorative element to hide the internal candle components from plain view and secures the ends of the support structure 206 in place, it also enables touch-sensitive operation of the candle.

A light source 212, such as an LED, can be placed inside the enclosure 214, as shown in FIG. 2(C). The light source 212 can, for example, project light of suitable color and/or intensity to the flame element 202. In some implementations, more than one light source 212 is used to illuminate the flame element 202 from one side, and/or from both sides. In some embodiments, the light source 212 can be an incandescent light source, a plasma light source, a laser light source, or can include other suitable light producing mechanisms.

Figure 3:
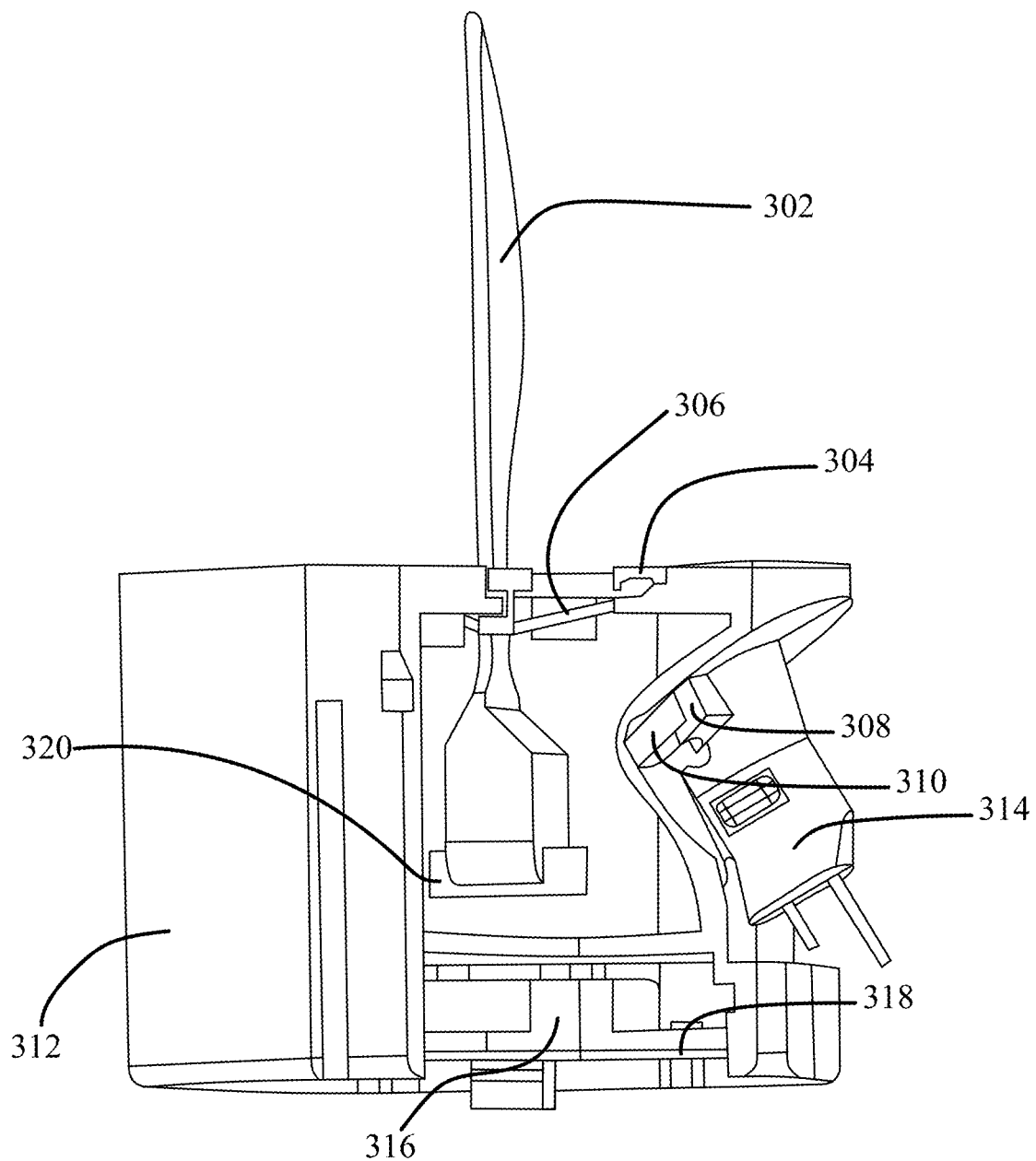
FIG. 3 illustrates components of an exemplary imitation candle device in more detail.

FIG. 3 shows additional details of the components of an exemplary imitation candled device that includes a flame element 302 that is suspended by a steel wire support structure 306. The bottom section of the flame element 302 below the steel wire support structure 306 can include a magnetic element 320 that interacts with a magnetic field produced by a coil 316. The coil 316 can be energized by control signals generated by electronic circuits that are located on, for example, a PCB board 318. In some implementations, the electronic circuits can generate pulses that cause the electromagnet to turn on and off, to vary the produced magnetic field strength, or to reverse polarity, at particular time instances. In one example, the signals that energize the coil 306 is a pulse-width modulated signal. In other examples, such signals provide an amplitude modulated, a phase modulated or a frequency modulated signal to the coil 306. Due to interactions of the magnetic element 320 with the magnetic field of the coil 306, the flame element 302 can oscillate and produce a flickering effect when illuminated by the light produced by the one or more light source 314. The imitation candle device can further include a wireless receiver component receives and decodes wireless signals transmitted thereto. For example, some components of such a wireless receiver can be located on the PCB board 318, and can operate based on one or more wireless technologies and protocols, such as infrared technology, Bluetooth or cellular protocols.

FIG. 3 also illustrates a ring 304 that is positioned on top of the imitation candle housing, around and in the vicinity of the flame element 302. In some embodiments, the ring 304 serves as a decorative piece to hide the internal components of the imitation candle device and/or to resemble melted wax. In this regard, the ring 304 can have a particular color and/or reflectivity to produce the desired visual effect when viewed under ambient illumination, or under the scattered and/or reflected illumination of the candle light source 314. In some embodiments, the ring 304 operates as a touch sensitive on-off switch. In particular, the ring 304 can be made of conductive material that forms a capacitive element in electrical connection with one or more components on the PCB board 318. When a user's finger contacts, or is within close proximity of, the ring 304, a capacitive contact is formed to complete a circuit. The touch-sensitive mechanism can be used for turning the candle on or off, or for controlling other functions of the imitation candle in a step-wise manner. For example, each touch can increase or decrease intensity of the light source 314, to switch the color of light, or to change a mode of operation (e.g., from flickering to constant intensity). In some embodiments, the touch sensitive element (shaped as a ring, or other shapes) includes two segments that are preferably poisoned at two different sides of the flame element on the top surface of the imitation candle device. In such embodiments, the two-piece touch sensitive element is configured to operate as a switch (e.g., conduct a current) only if both segments of the touch sensitive element are touched. For example, a user can touch one segment of the touch sensitive element that is positioned close to, and on one side of, the flame element with his/her thumb, and the other segment of the touch sensitive element that is positioned close to, and on an opposite side of, the flame element with his/her index finger to activate the switch and turn off the imitation candle device. As such, the multi-segment touch element can be used to simulate the appearance that the user is extinguishing the candle flame using his/her fingers.

The imitation candle device of FIG. 3 also includes a microphone 310 that is held in place within the interior of the imitation candle device by a microphone support element 308. The microphone 310 converts acoustic signals into electrical signals that are provided to an electronic component on the PCB board 318. The microphone 310 is positioned closer to the top surface of the imitation candle device to intercept sound waves that travel into the interior of the imitation candle device. For example, the top section of the imitation candle device can include an opening (e.g., the same opening that allows light from the light source 314 to reach the flame element 302) that allows the microphone to capture acoustic waves that travel down into the interior of the imitation candle device. In this way, when a user blows in the direction of the imitation flame element 302, the blow is captured by the microphone 310, and the appropriate signals are generated to turn off the imitation candle device.

The electrical signals produced by the microphone 310 can be processed by the components of the PCB board 318. The PCB board 318 can, for example, include filters, analogto-digital circuits and/or a processor or controller (e.g., a microprocessor, a digital signal processor (DSP), an FPGA, an ASIC, etc.) that receive signals representing the captured sound waves. The processor can execute program code stored on a non-transitory storage medium, such as ROM, a RAM or other memory device, to analyze the signals corresponding to the sound waves and to determine that a blow has occurred. Upon detection of a blow, a corresponding signal can be produced to turn off the light source 314 and/or the entire imitation candle device. The program code that is executed by the processor can include an algorithm that differentiates between captured sounds of blowing air and other sounds such as clapping or human conversation.

In some embodiments, the blow detection circuitry can be implemented as a separate component from other components of the PCB board 318. For example, the blow detection can be implemented using analog or digital circuits. In some embodiments, to facilitate the detection of a blow, the microphone 310 that is mounted is coupled to an amplifier to generate an AC signal above a predetermined threshold voltage value (e.g., 200 mV), or a within a predetermined range of values (e.g., 200 mV to 3.5 V). Whereas the sound pressure/level due to a blow provides voltage values above such a threshold (or within such predetermined range of values), other sounds, such as a clapping sound, detected by the microphone can only generate an AC signal below the threshold value (e.g., at 20-100 mV), or outside of the predetermined range of values that correspond to the detection of the blow. The resulting signal of the amplifier can be further coupled to a second stage amplifier with a high amplification factor (e.g., 100 to 300 times). In some implementations, the second stage amplifier is a capacitive coupling transistor amplifier that forms a square wave that is provided to the processor to shut down the candle device. If the captured sound wave produces a signal below the threshold, such a signal does not activate the second stage amplifier (e.g., the transistor amplifier), and thus the appropriate signal for shutting down the candle device is not generated. It should be noted that, in the above description, voltage values are provided as examples to facilitate the understanding of the disclosed embodiments. It is, however, understood that other measurements, such as measured current values, may be used for identifying the blow, and/or different ranges of values may be used to effectuate the identification.

It should be noted the above description has been provided with reference to an imitation candle device with a moving flame element. It is, however, understood that the use of a microphone for blow detection can be implemented in other imitation candle configurations, such as those that utilize non-magnetic means for moving the flame element, in candle devices with a stationary flame element, or any other imitation candle device that can accommodate a microphone and the associated circuitry. Moreover, in some applications, the disclosed technology may be implanted as part of an imitation fireplace, an imitation candelabra, or other lighting fixtures. Further, in some implementations, a device other than a microphone, such as flow sensor, can be used to detect the blow.

Figure 4A:
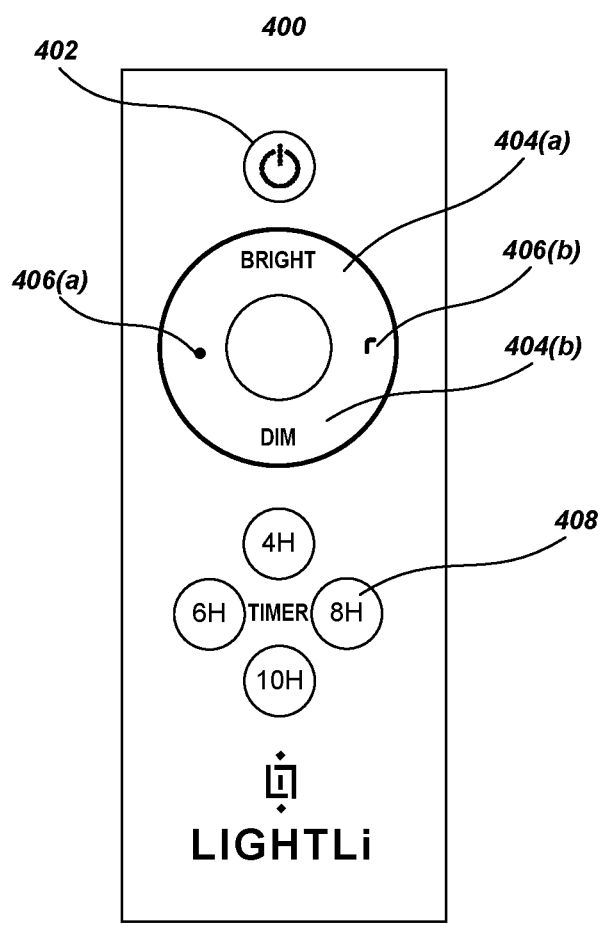
FIG. 4(A) is a picture of an exemplary remote control device for an imitation candle device.

As noted in connection with FIG. 1, the disclosed imitation candle devices may be equipped with a remote control device that enables control of various candle functionalities from a remote location. An exemplary remote control device 400 is shown in FIG. 4(A). Various buttons on the remote control device 400 enable a user to remotely control various features of one or more associated imitation candle devices. In particular, an on-off button 402 allows the imitation candle device to be turned on or off remotely. The brightness/dimness of the candle device is controlled by two switches, 404(a) and 404(b), that are positioned below the on-off button 402, and the speed of the flickering and/or movement of the candle's flame element is controlled via switches 406(a) and 406(b). The remote control device 400 further includes one or more timer buttons 408 (e.g., 4-stage timer buttons) that allow the imitation candle device to operate for any one of several timed durations (e.g., a 4-hour, a 6-hour, a 8-hour or a 10-hour duration) before the candle device is automatically turned off. To activate the timer operation, a user can, for example, press the central timer button followed by the desired duration button. The remote control device 400 can also include additional buttons (e.g., a candle selection button, a blow on-off activation button, a wireless coupling button, etc.) to enable additional operations and communications with one or more imitation candle devices.

Figure 4B:
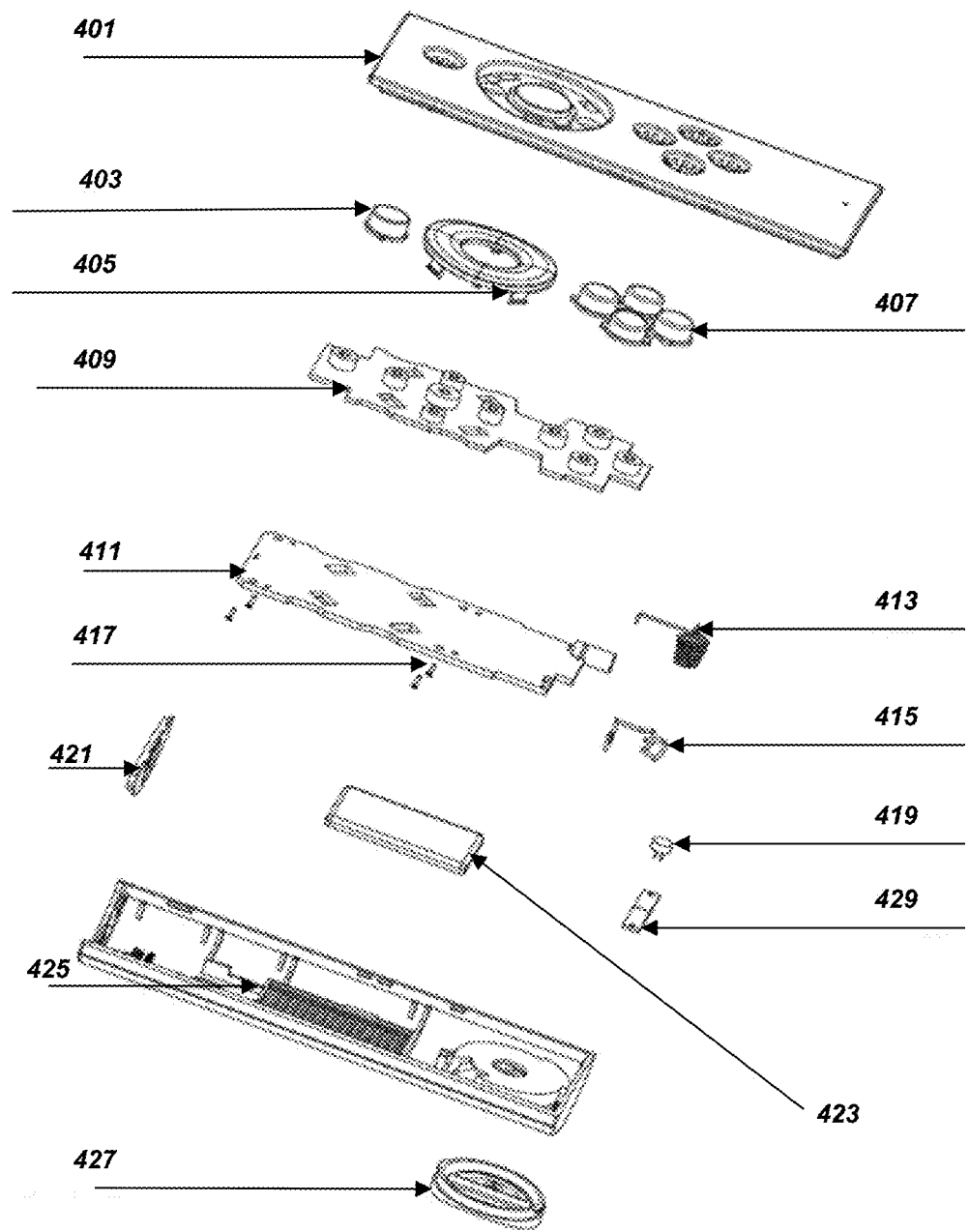
FIG. 4(B) illustrates components of the remote control device of FIG. 4(A).

FIG. 4(B) illustrates an exploded view of the components of the exemplary remote control device of FIG. 4(A). An upper cover 401 includes openings that accommodate different buttons, such as a power button 403, a circular button 405 with quad activation sections and one or more timer buttons 407. A flexible layer 409 (such as a silicone sheet) with appropriate stiffness is positioned below the buttons on top of a PCB board 411 that includes electronic circuitry. The remote control device also includes a negative side spring 413 and positive side spring 415 and screws 417. A microphone 419 is placed on a microphone board 429 to capture sounds and to generate electric signals therefrom. The remote control device may also includes a side cover 421 that allows (e.g., through a hole in the side cover 421) an infrared receiver and/or transmitter to communicate with another device. A weight 423 may also be added, as needed, to assist with obtaining the desired weight and/or balance for the remote control device. The bottom cover 425 includes a battery compartment that accommodates one or more batteries and the corresponding battery cover 427.

Figure 4C:
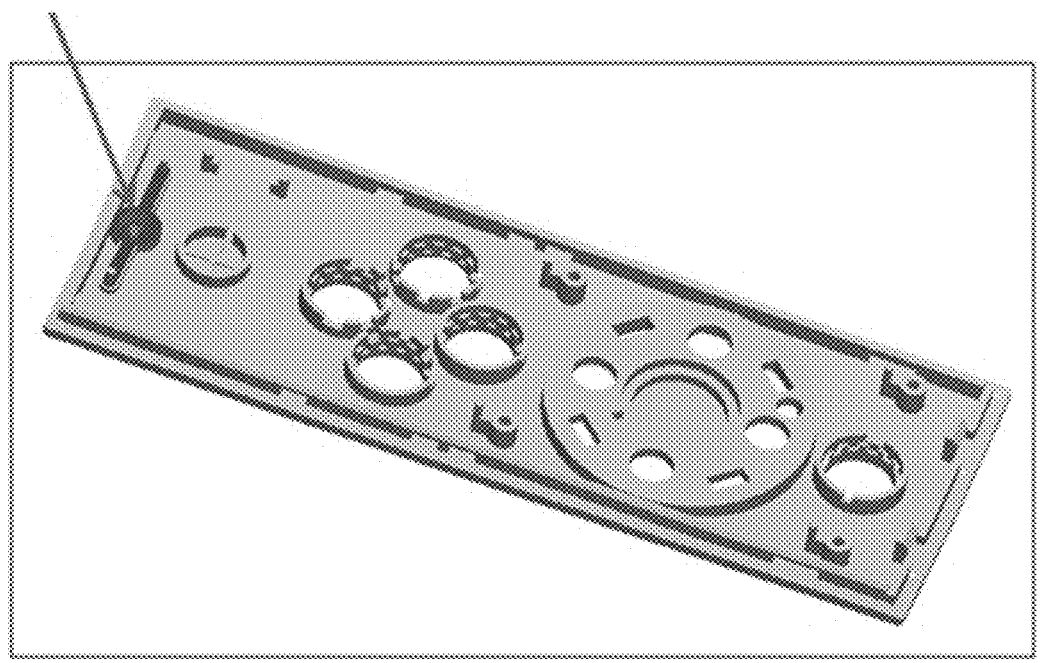
FIG. 4(C) illustrates an exemplary location of a microphone hole on the remote control device.

As evident from FIG. 4(B), the remote control device includes a microphone 419 and the corresponding circuit broad 429 that are used for capturing and identifying a blow. FIG. 4(C) illustrates an exemplary location of microphone hole on the top cover of the remote control device. Similar to the above description regarding the imitation candle device, in some embodiments, a user can blow at the remote control device in the vicinity of the microphone hole to control a functionality of the imitation candle device, such as to turn the candle off.

Figure 4D:
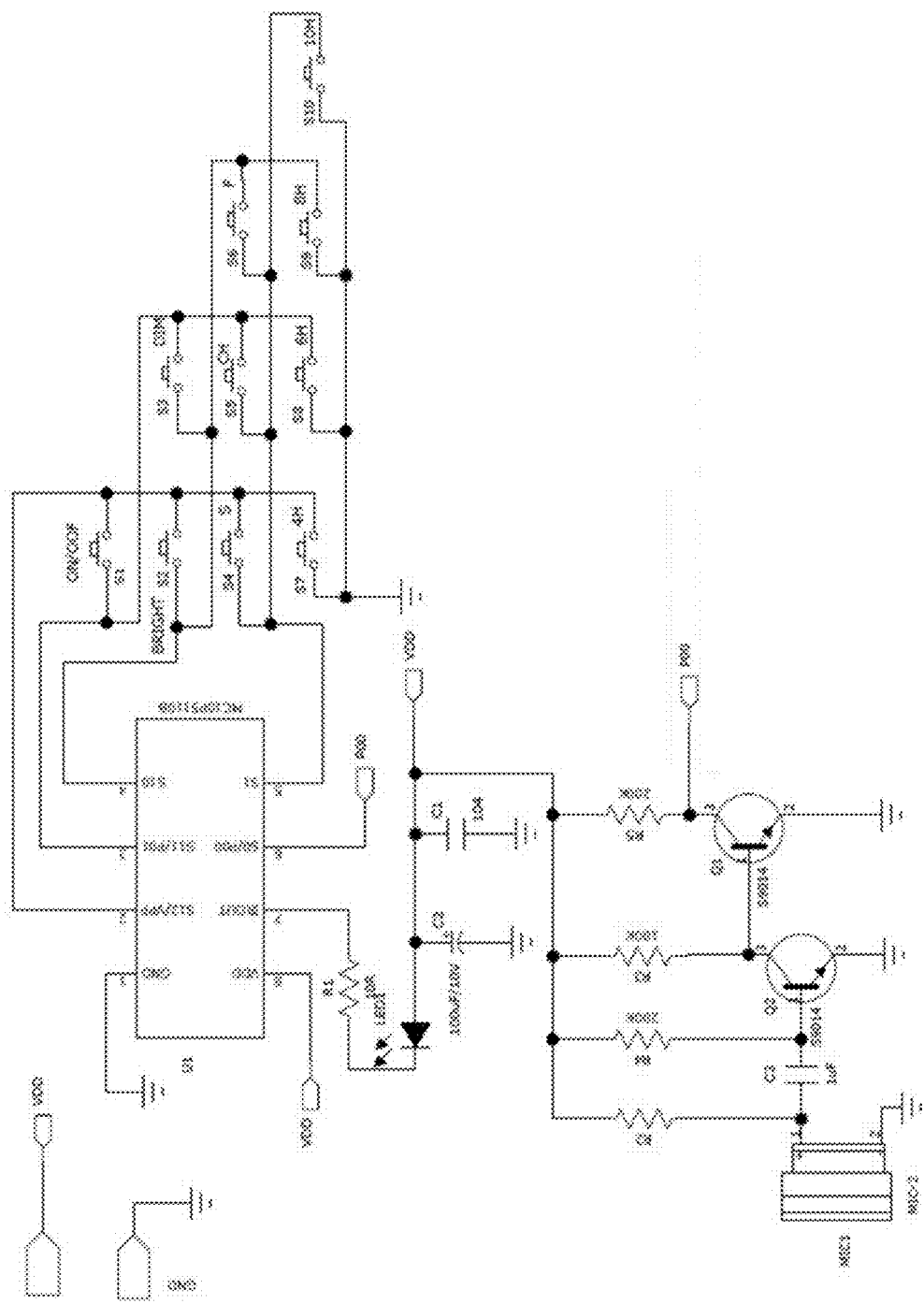
FIG. 4(D) illustrates an exemplary circuit diagram associated with a remote control device.

FIG. 4(D) illustrates an exemplary circuit diagram associated with the electrical components of the remote control device. The circuit is powered (at VDD) using a battery, such as a CR2032 lithium button battery that supplies a voltage in the range 2.2 to 3.2 V to the chip U1. In some implementations, the chip U1 includes a microprocessor. It is, however, understood that the chip U1 may include, or be designed as, an FPGA, an ASIC, a DSP, or discrete circuit components. The chip U1 controls various operations of the remote control device, such as detecting that a switch (e.g., one of switches S1 to S10) has been pressed. The chip U1 includes an IRout pin that controls an infrared LED for transmitting an infrared signal to another device. The electric current from the battery is filtered by capacitors C1 and C2 and provided to the IR LED. A microphone (MIC1) is coupled to a two-stage electronic circuitry, notably transistors Q1 and Q2 and associated biasing and amplification components (e.g., resistors R2-R5). In some embodiments, the chip U1 reaming in an idle operating status when a "high" voltage is present at an input pin that corresponds to a certain functionality, such as an on/off functionality, a timing functionality, a brightness increase functionality, a brightness decrease functionality, a pause/slow/stop flame movement functionality, a fluctuating/fast/start flame movement functionality, a blow detection functionality, and so on. In such embodiments, the chip U1 waits until a low signal occurs. For example, when a blow is directed to the microphone hole of the remote control device, a sound a wave having a certain intensity or sound pressure is produced at the head of the microphone. In an exemplary embodiment, such a blow generates an AC signal of about 200 mV or more that is subsequently amplified by 100-300 times, forming square waves that pull the appropriate input of the chip U1 to a low voltage value for a predetermined duration. As a result, the infrared transmitter is activated and a signal is transmitted to the candle device to turn the candle off. Implementing the blow detection circuits as a separate subsystem of the remote control system (as done in the exemplary diagram of FIG. 4(D)) allows the blow detection capability to be added to an existing remote control device without having to redesign the internal circuits or programming of the chip U1. In addition, implementation of the blow detection subsystem in discrete components can allow faster detection speed since additional delays due to processing by the chip U1 are avoided. As noted earlier, the disclosed embodiments also prevent inadvertent activation of this feature based on background noises and unwanted sounds. In some embodiments, the blow detection circuitry and/or associated recognition software instructions can be adapted to cause a fluttering movement of the simulated flame. For example, if the strength of the detected blow is below a particular threshold (e.g., a particular voltage value), the blow can be identified as not being strong enough to extinguish the simulated flame. As such, the detection of such a blow can cause the intensity and pattern of illumination of the flame element to change to simulate a real candle that is fluttering in the wind.

It is thus evident that, in one aspect of the disclosed technology, an imitation candle device is provided that includes a body, a flame element protruding from top of the body, one or more light sources positioned to illuminate the flame element to produce an appearance of a true fire flame, a sensor positioned within the body to detect a blow of air directed at the imitation candle device, and electronic circuitry positioned within the body to receive electrical signals produced by the sensor and to modify an output light of the one or more light sources in response to detection of the blow. In one exemplary embodiment, the sensor is a microphone that produces the electrical signals in response to detection of an acoustic wave. In another exemplary embodiment, the sensor is an air flow sensor that produces the electrical signals in response to detection of flowing air in the vicinity of the air flow sensor. In yet another exemplary embodiment, the imitation candle device includes an opening at a top section of the body in the vicinity of the flame element to receive the blow of air and to direct at least a portion of the blow to within the body.

According to another exemplary embodiment, the electronic circuitry is configured to differentiate the received electrical signals that are associated with the blow of air from the received electrical signals that are nor associated with the blow of air. For example, the received electrical signals that are not associated with the blow of air can include electrical signals associated with: an ambient noise, a clap, or a human speech. In another exemplary embodiment, the electronic circuitry includes a first stage detection circuit coupled to the sensor to receive the electrical signals produced by the sensor, and a second stage detection circuit having an input that is coupled to an output of the first stage detection circuit. The second stage detection circuit has an output that indicates the detection of the blow in response to receiving a voltage or a current value within a predetermined range from the first stage detection circuit. For example, the first stage detection circuit produces an output in the predetermined range upon detection of the electrical signals that correspond to the blow, and produces an output that is outside of the predetermined range upon detection of the electrical signals that do not correspond to the blow.

In still another exemplary embodiment, the electronic circuitry, in response to detection of the blow, turns off one or more of the light sources. In yet another exemplary embodiment, the electronic circuitry, in response to detection of the blow, turns off the imitation candle device. In some embodiments, the electronic circuitry is configured to turn off the imitation candle device in response to detection of the blow for a predetermined duration of time. In yet another embodiment, the imitation candle device further includes a touch sensitive component positioned on, or close to, an outer surface of the body to sense a touch and to produce an electrical signal in response to the detected touch that turns the imitation candle device, or the one or more of the light sources, on or off. According to another exemplary embodiment, the touch sensitive component is shaped as an annulus that encircles the flame element.

In some exemplary embodiments, the imitation candle device further includes a remote control device that is configured to transmit a signal to the electronic circuits to control one or more operations of the imitation candle device. In one exemplary embodiment, the remote control device includes an electronic circuit board and a microphone coupled to the electronic circuit board. The microphone is positioned to intercept sounds through an opening on the remote control device, to produce an electrical signal in response to the detected sounds, and to provide the electrical signals to a component on the electronic circuit board. For example, the component on the electronic circuit board can includes a two-stage detection circuitry having an output that indicates the detection of a blow of air in response to detecting a voltage or a current value within a predetermined range.

In some exemplary embodiments, the remote control device further comprises a wireless transmission device that is activated to produce a signal for transmission to a receiver device within the body of the imitation candle device upon detection of the output that indicates the detection of a blow of air. For example, the wireless transmission device can include one or more of: an infrared transmission device, a Bluetooth transmission device, or a cellular transmission device.

Figure 5A:
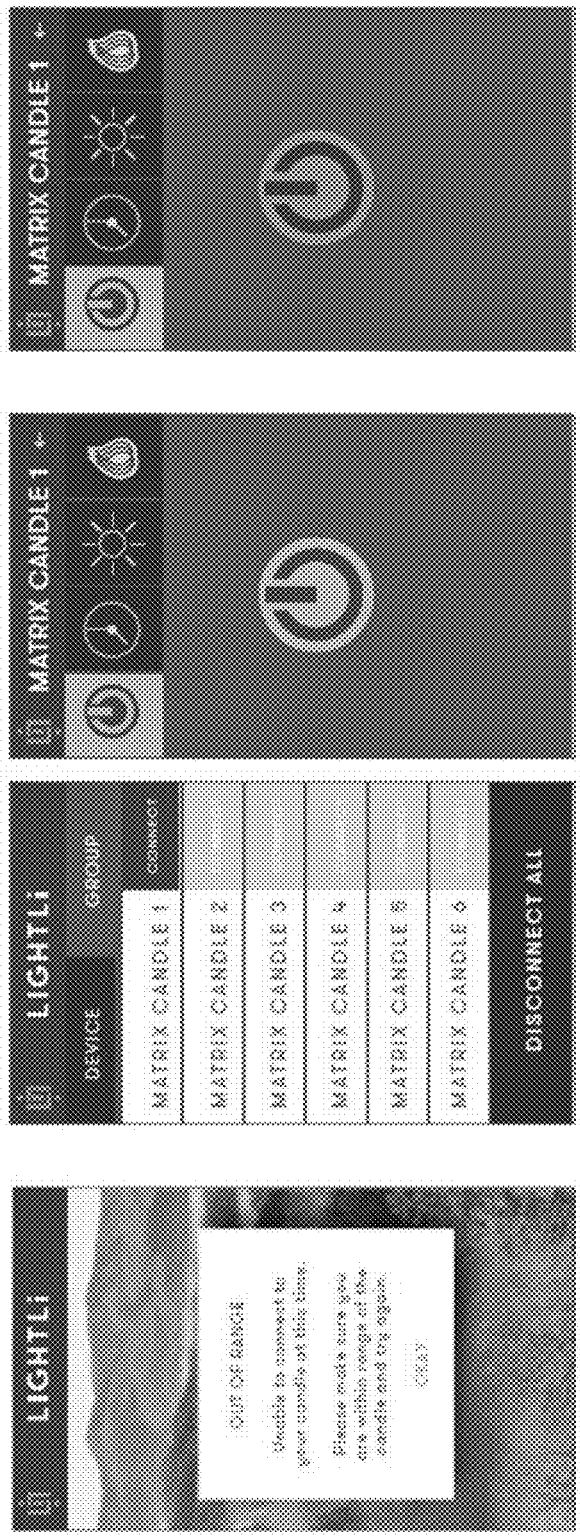
FIG. 5(A) is a series of exemplary user interface screens associated with an application for controlling the operations of an imitation candle device.
Figure 5B:
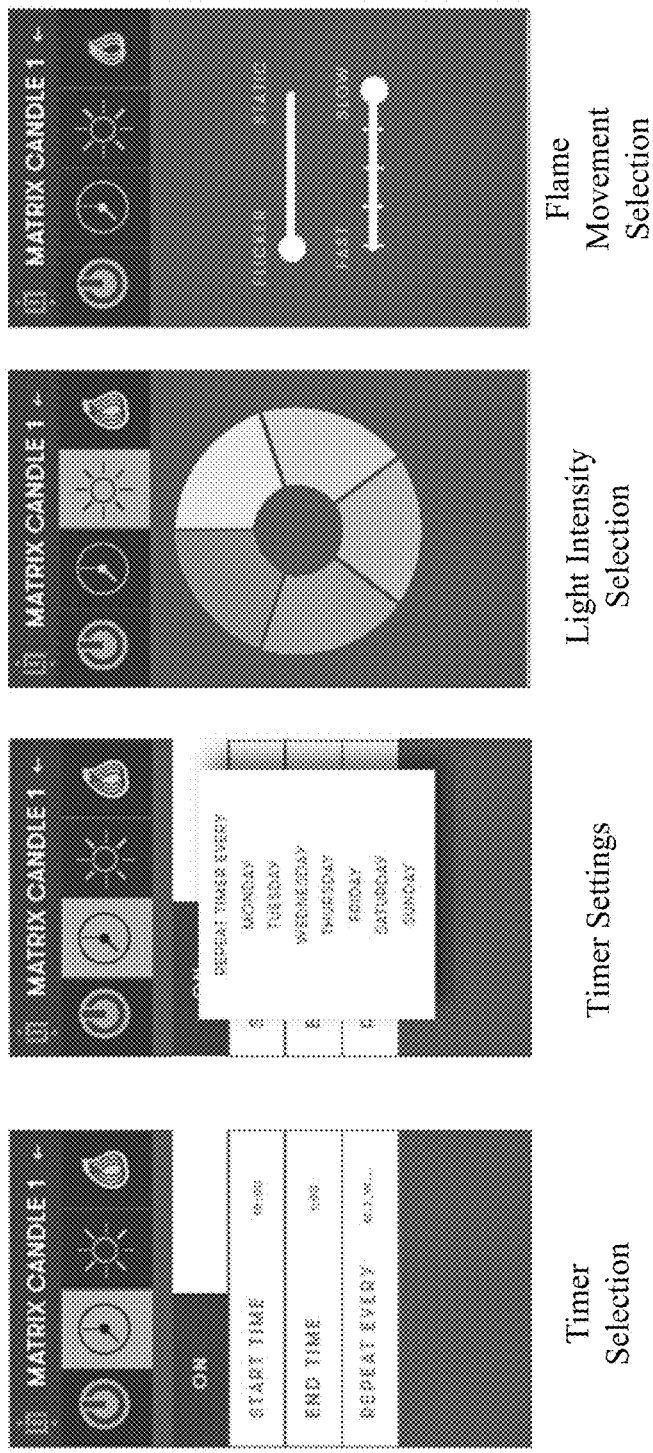
FIG. 5(B) is a series exemplary user interface screens for setting a timer and controlling illumination properties of an imitation candle device.
Figure 5C:
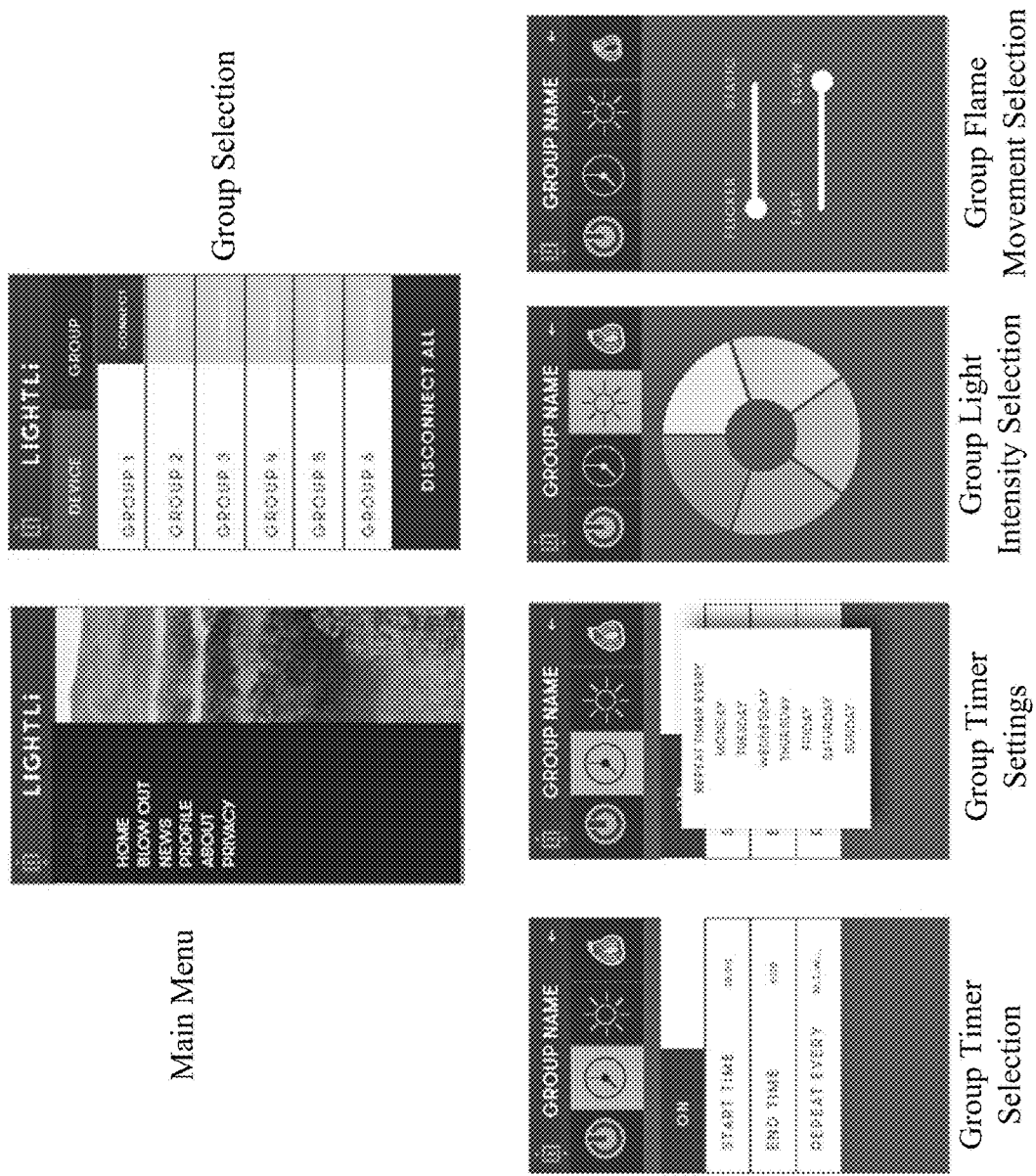
FIG. 5(C) is a series of exemplary user interface screens for controlling the operations of a group of imitation candle devices.

In some embodiments, the remote control functionalities and features are implemented as a application on an electronic device, such as a smart phone, a tablet, a laptop or similar devices. Such an application enables different features to be implemented in a user-friendly manner on a graphical user interface (GUI), and further facilitates the addition of new features and/or improvements via software updates. FIGS. 5(A) to 5(C) provide exemplary user interface screens of one exemplary application. For example, as shown in FIG. 5(A), the application can determine as to whether or not a particular imitation candle device is within the range of communication, and provides an indication if the application is unable to establish a link with one or more candles. For example, such a link can be established via Bluetooth. The application further enables a user to select a particular candle device among a plurality of candle devices, as shown in FIG. 5(A)'s selection of Matrix Candle 1. As further shown in FIG. 5(A), once a particular candle device is selected, the user interface allows the selected candle to be turned on or off by selecting the on-off button, and activating the button as needed.

FIG. 5(B) illustrates activation of additional functionalities through the user interface. In particular, in the exemplary user interface screen in FIG. 5(B), the timer selection option allows setting of a start time, an end time and repetition period. The timer setting can further be customized to activate the desired feature on particular days of the week (e.g., by clicking on or highlighting the particular day(s) of interest on the menu of the user interface). The remote application further allows the selection of an appropriate candle light intensity by, for example, clicking on one of the segments of the depicted light wheel. Such a selection allows adjustment of light intensity in order to, for example, accommodate different moods and/or different ambient lighting conditions. The movement of the flame element can also be controlled via the remote application, by, for example, selecting an amount of flicker on a sliding bar that ranges from full flicker to an appearance of a static flame. Additional control features (e.g., via a second sliding bar) may also be provided to control the speed of flickering. Upon selection of the appropriate level of light intensity and/or flame movement, the appropriate control signals are generated at the remote control device and transmitted to the imitation candle device. Upon reception of such control signals, the imitation candle device adjusts or activates/deactivates the selected features.

FIG. 5(C) illustrates additional exemplary operations and selection capabilities of the remote control application. For example, selection of an item on the Main Menu (e.g., Home, Blow Out, news, Profile, About and Privacy) allows the user to navigate through the corresponding menu item. One feature of the disclosed remote application enables the selection of a group of candle devices. Such a group can, for example, be formed by selecting individual candle devices to be part of the group, and assigning a group name (e.g., by typing a desired group name). Once a group is formed, various functionalities of the candle devices within the group can be activated and/or adjusted. For example, as shown in FIG. 5(C), group timer selection, group time settings, group light intensity selection and group flame movement selection can be made in a similar manner as described in connection with an individual candle device. Additionally, if desired, a single disconnect button on the user interface can sever communications with all devices within the group or groups.

Figure 5D:
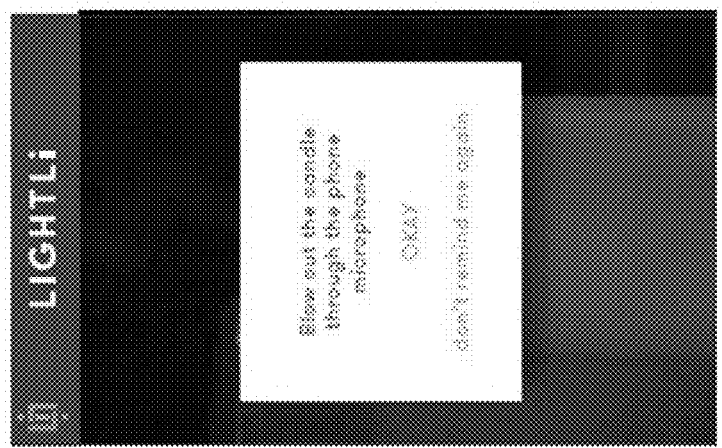
FIG. 5(D) is an exemplary user interface screen related to a blow out feature of an imitation candle device.

The blow on-off functionality can also be activated via the user interface by selection the Blow Out item on the main menu (see FIG. 5(C)). Once the blow out functionality on the remoted device is activated, the application can provide a notification to the user (see FIG. 5(D)) that the candle device can be turned off by blowing into the microphone of the electronic device (e.g., a mobile phone). The candle application receives the signals that are produced by the device's microphone, and upon detection of the blow, generates an appropriate signal for transmission to the candle device. The candle device, upon receiving the signal from the remote control device, turns the candle off. In some implementations, the blow is detected by processing the intensity and/or pattern of data that is received from the microphone to distinguish and prevent ambient or unwanted sounds from inadvertently generating a blow off signal. Such a processing can, for example, include correlation and pattern recognition operations that produce a match only when a pattern and/or intensity of a blow is detected. In some implementations, the detection of the blow is carried out cooperatively between the remote control device and the imitation candle device.

In some embodiments, a variety of imitation candle devices (e.g., produced by the same manufacturer) can be operated by a single multi-customized remote control device (e.g., a dedicated remote control device, such as the one illustrated in FIGS. 4(A) to 4(C), or remote control implemented on an electronic device). The function buttons or selections on the remote control device allows a user to control different features of the imitation candle device (e.g., the brightness to dimness, fast to slow movement/flame, different hours of timer) for each of the imitation candle devices individually, or as a group. Such selectivity, greatly enhances the user's interactions with multiple devices, and enables detailed customization of the desired candle functions for candles that are located in different locations and ambient conditions. In one example, the remote control device is IR-based and can operate on multiple frequencies. In some embodiments, the remote control device is configured to ascertain remote control operating frequencies from other imitation candle products and devices and, once obtained, effectuate remote control of the functionalities of those devices. For example, the remote control device can attempt communicating with an unknown imitation candle device at different operating frequencies in a trial and error fashion until the unknown imitation candle device responds (e.g., turns off). In one example implementation, an infrared remote control candle operates at 32 KHz frequency. In another example, the candle can accept and receive a plurality of codes (e.g., 1 through N) to identify particular candles (e.g., entered by a user). Moreover, in some embodiments, a user may have a specific identification code that identifies a specific user.

Figure 6:
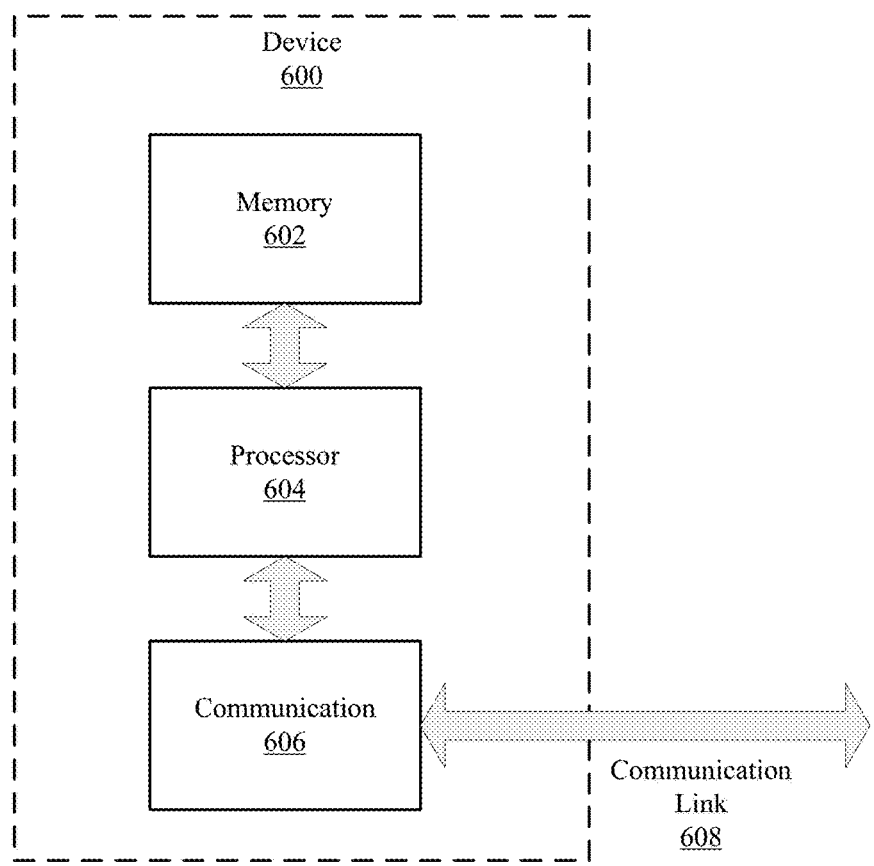
FIG. 6 is a block diagram of electronic components of a device that can be used to accommodate some of the disclosed embodiments.

FIG. 6 illustrates a block diagram of a device 600 within which some of the disclosed embodiments may be implemented. The device 600 comprises at least one processor 602 and/or controller, at least one memory 604 unit that is in communication with the processor 602, and at least one communication unit 606 that enables the exchange of data and information, directly or indirectly, through the communication link 608 with other entities, devices and networks. The communication unit 606 may provide wired and/or wireless communication capabilities in accordance with one or more communication protocols, and therefore it may comprise the proper transmitter/receiver (transceiver) antennas, circuitry and ports, as well as the encoding/decoding capabilities that may be necessary for proper transmission and/or reception of data and other information.

For example, the device 600 can facilitate implementation of an imitation candle system. Such a system includes an imitation candle device and a portable electronic device wirelessly coupled to the imitation candle device. The imitation candle device includes a body, a flame element protruding from top of the body, one or more light sources positioned to illuminate the flame element to produce an appearance of a true fire flame, and electronic circuitry to control at least an output of the one or more light sources. The electronic circuitry also includes a wireless receiver to receive wireless signals. The portable electronic device includes a display, a wireless transceiver, a processor, and a memory including processor executable code. The processor executable code, when executed by the processor, configures the portable electronic device to present a graphical user interface on the display. The graphical user display includes buttons or fields that allow activation of a blow off feature of the imitation candle device by blowing on the portable electronic device, and activation one or more of the following operations of the imitation candle device: a power-on or power-off operation, a selection of a particular imitation candle device, a selection of a timer feature, a setting of a timer value, a selection of a light intensity level, an adjustment of a light intensity level, a selection of a movement of the flame element, a setting of a level of movement of the flame element, or a selection of a group of imitation candle devices.

In one exemplary embodiment, the portable electronic device further includes a microphone. In this embodiment, the processor executable code, when executed by the processor, configures the portable electronic device to, upon activation of the blow off feature on the electronic device, detect an intensity or pattern of electrical signals produced by the microphone that correspond to a blow of air, and to activate the wireless transceiver of the electronic device to transmit a signal to the imitation candle device to allow the imitation candle device to be turned off. In some exemplary embodiments, the processor executable code, when executed by the processor, configures the wireless transceiver to, upon selection of the particular imitation candle device, transmit a signal to the particular imitation candle device to establish a wireless connection with the particular imitation candle device. In some embodiments, the wireless transceiver can be configured to operate according to a Bluetooth or a cellular wireless communication protocol.

In some embodiments, the above noted system includes one or more additional imitation candle devices. In such embodiments, the processor executable code, when executed by the processor, configures the portable electronic device to, upon the selection of a group comprising more than one imitation candle device, transmit command signals to conduct identical operations on all imitation candle devices in the group. For example, the command signals can include one or more of: an indication to change light intensity levels, an indication to change movement level of flame elements, an indication to change set timer values, an indication to turn off all imitation candle devices, or an indication to disconnect all imitation candle devices.

In one exemplary embodiment, the portable electronic device is one of a smart phone, a table device, or a laptop computer. In another exemplary embodiment, the imitation candle device further includes a magnetic drive, and a magnetic element coupled to a bottom section of the flame element that interacts with the magnetic drive to cause movement of the flame element. In yet another exemplary embodiment, the processor executable code, when executed by the processor, configures the portable electronic device to, upon the selection of a movement of the flame element and setting of the movement to a particular level, transmit a signal to the imitation candle device to cause a change in amount of movement of the flame element.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:
1. An imitation candle system, comprising:
an imitation candle device, comprising:
  a body;
  a flame element protruding from top of the body;
  one or more light sources positioned to illuminate the flame element to produce an appearance of a true fire flame; and
  electronic circuitry to control at least the an output of the one or more light sources, the electronic circuitry including a wireless receiver to receive wireless signals;
a portable electronic device wirelessly coupled to the imitation candle device and including:
  a display;
  a wireless transceiver;
  a processor; and a memory including processor executable code, the processor executable code, when executed by the processor, configures the portable electronic device to present a graphical user interface on the display, wherein the graphical user display includes buttons or fields that allow activation of a blow off feature of the imitation candle device on the electronic device, and activation of one or more of the following operations of the imitation candle device:
a power-on or power-off operation;
a selection of a particular imitation candle device;
a selection of a timer feature;
a setting of a timer value;
a selection of a light intensity level;
an adjustment of a light intensity level;
a selection of a movement of the flame element;
a setting of a level of movement of the flame element; or
a selection of a group of imitation candle devices.

2. The imitation candle system of claim 1, wherein the portable electronic device further includes a microphone, and
the processor executable code, when executed by the processor, configures the portable electronic device to, upon activation of the blow off feature on the electronic device,
detect an intensity or pattern of electrical signals produced by the microphone that correspond to a blow of air; and
activate the wireless transceiver of the electronic device to transmit a signal to the imitation candle device to allow the imitation candle device to be turned off.

3. The imitation candle system of claim 1, wherein the processor executable code, when executed by the processor, configures the wireless transceiver to, upon selection of the particular imitation candle device, transmit a signal to the particular imitation candle device to establish a wireless connection with the particular imitation candle device.

4. The imitation candle system of claim 3, wherein the wireless transceiver is configured to operate according to a Bluetooth or a cellular wireless protocol.

5. The imitation candle system of claim 1, including one or more additional imitation candle devices, wherein the processor executable code, when executed by the processor, configures the portable electronic device to, upon the selection of a group comprising more than one imitation candle device, transmit command signals to conduct identical operations on all imitation candle devices in the group.

6. The imitation candle system of claim 5, wherein the command signals include one or more of:
an indication to change light intensity levels;
an indication to change movement level of flame elements;
an indication to change set timer values;
an indication to turn off all imitation candle devices; or
an indication to disconnect all imitation candle devices.

7. The imitation candle system of claim 1, wherein the portable electronic device is one of a smart phone, a table device, or a laptop computer.

8. The imitation candle system of claim 1, wherein the imitation candle device further includes a magnetic drive, and a magnetic element coupled to a bottom section of the flame element that interacts with the magnetic drive to cause movement of the flame element.

9. The imitation candle system of claim 8, wherein the processor executable code, when executed by the processor, configures the portable electronic device to, upon the selection of a movement of the flame element and the setting of the movement to a particular level, transmit a signal to the imitation candle device to cause a change in amount of movement of the flame element.

10. The imitation candle system of claim 1, wherein the imitation candle device further comprises a touch sensitive component positioned on, or close to, an outer surface of the body to sense a touch and to produce an electrical signal in response to the detected touch that turns the imitation candle device, or the one or more of the light sources, on or off.

11. The imitation candle system of claim 10, wherein the touch sensitive component is shaped as an annulus that encircles the flame element.

12. The imitation candle system of claim 1, wherein the wireless transceiver includes an infrared transceiver device.

13. The imitation candle system of claim 1, wherein the processor executable code, when executed by the processor, configures the portable electronic device to, upon detection of a blow for a predetermined period of time, transmit a signal to the imitation candle device to cause the imitation candle device to be turned off.

* * * * *